US006189571B1

(12) United States Patent
Hedlund

(10) Patent No.: US 6,189,571 B1
(45) Date of Patent: Feb. 20, 2001

(54) VALVE MANIFOLD DEVICE

(75) Inventor: Staffan Hedlund, Skärholmen (SE)

(73) Assignee: AB Rexroth Mecman, Stockholm (SE)

( * ) Notice: Under 35 U.S.C. 154(b), the term of this patent shall be extended for 0 days.

(21) Appl. No.: 09/427,518

(22) Filed: Oct. 26, 1999

(30) Foreign Application Priority Data

Nov. 12, 1998 (SE) .......... 9803873

(51) Int. Cl.[7] .......... F16K 11/10
(52) U.S. Cl. .......... 137/884; 137/269
(58) Field of Search .......... 137/269, 884

(56) References Cited

U.S. PATENT DOCUMENTS 3,391,703 * 7/1968 Kay .......... 137/884
3,513,876 * 5/1970 Tarbox .......... 137/269
4,041,972 * 8/1977 Hoepfl et al. .......... 137/269
4,951,709 * 8/1990 Kirkham .......... 137/561 A

* cited by examiner

*Primary Examiner*—John Fox
(74) *Attorney, Agent, or Firm*—Townsend and Townsend and Crew LLP

(57) ABSTRACT

A valve manifold device for mounting pressure fluid valves (2) on a surface comprising a valve interface (A—A) and including channels (7–7',8) for supply and possibly return fluid, wherein channels are arranged for leading fluid to and from the valve interface and thereby the different valves, is distinguished in:

that the manifold device (4) comprises a manifold interface (B—B) on a side separate from the valve interface (A—A), that each connecting channel for supply fluid includes a first portion (10,10') between a channel (7) and the manifold interface and a second portion between the manifold interface (B—B) and the valve interface (A—A), and that a selectable modular body (5,5',5",30) is provided for connecting (12,32) said portions or to block (14,14') the first portion and lead on the second portion, or to block both portions.

15 Claims, 4 Drawing Sheets

VALVE MANIFOLD DEVICE

This invention concerns a valve manifold device according to the preamble of claim 1.

In a previously known valve manifold device a number of pressure fluid valves are mounted on a valve interface, which for the respective valve positions provides ports comprising openings to the connecting channels which connect longitudinal channels in the manifold with the valves to be mounted thereon. In a standard manifold device for 5/2 and 5/3 valves respectively there are normally three main channels, whereof the central one is usually used for pressure fluid supply whereas the ones positioned on the sides are used for return fluid. Some times however, the channels positioned at the sides are used for pressure air supply, whereas in that case the central channel comprises a return fluid channel. It is also common in certain manifold systems to use both solutions, which is possible by sealing the channels somewhere along the length of the manifold device and feed from both directions. This way pressurized air may be supplied in the same channel/channels or in different channels. One reason for the desire to feed in the channels at the sides, is the desire for different feed pressures, for example when the consumer is a cylinder with a great load to be moved vertically. In the downward movement the gravity force co-operates with the return side force, resulting in high acceleration in case the return pressure is not reduced. It is also usual, even in other applications, to use a lower return pressure than forward pressure in order to save pressurised air and energy.

Further, sometimes it is desired to provide separate pressure supply to a specific valve on the manifold device, which according to the prior art has been realised in that the manifold later has been modified at the position of that valve, which results in a complicated and expensive solution. In cases where electric leads are integrated in valve manifold devices consisting of stacked plates, also the electric circuit has to be changed when modifications of the installation are called for, such as when exchanging one manifold plate or putting in an extra manifold plate into the manifold device.

Further, there is often a desire to provide manifold devices with different valves, for example both 3/2 valves and 5/2 valves, whereby the above mentioned problem with respect to sealing and adjusted supply must be addressed.

The invention aims to eliminate the problems of the prior art.

This aim is obtained according to the invention in a valve manifold device according to the above through the features of the characterising portion of claim 1.

By this way the connecting channel being controllable through the application of a chosen modular body, the valve function may easily be chosen. When the modular body is adapted to connect the portions, connection is achieved between the supply channel and the valve. By blocking the first portion and lead on the second portion, possibility of separate feeding the valve is simply achieved. By blocking both portions, this part of the valve is immobilised. The invention thus simply provides the possibility of arranging supply with a desired pressure for separate valves at separate valve positions.

Further advantages are obtained through the features of the further claims and will be clear from the following description of embodiments of the invention, which are explained with reference to the annexed drawings, wherein:

Figure 1:
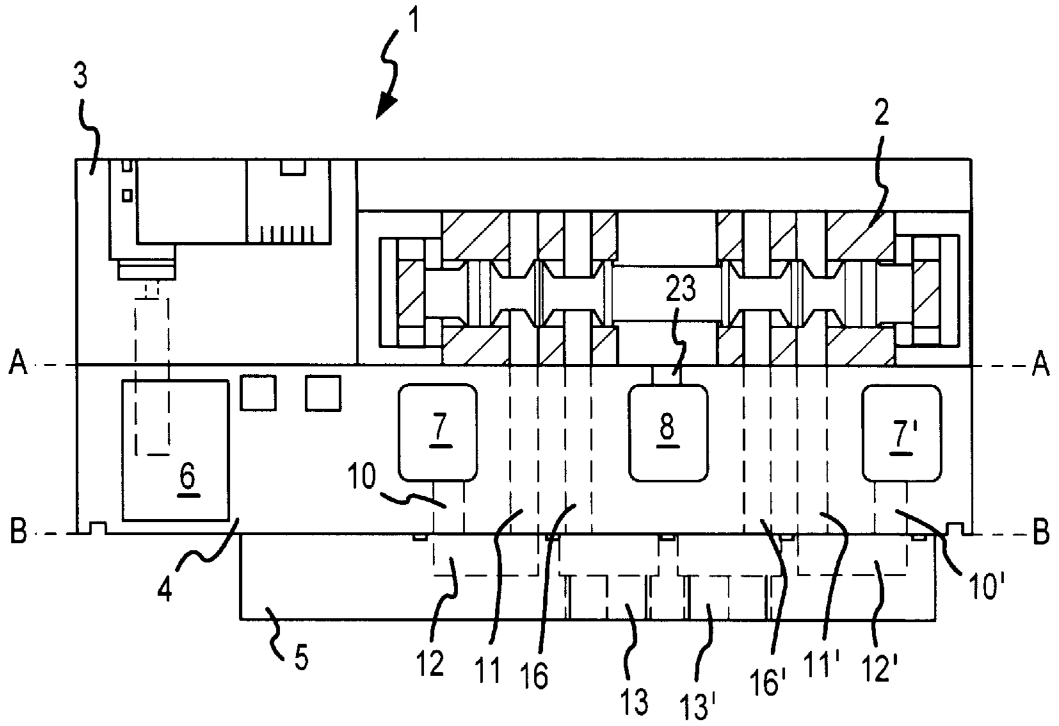
FIG. 1 shows a device according to the invention in a first configuration.

In FIG. 1 reference 1 concerns a valve manifold device with a valve 2, which is controlled by a pilot valve which is located in a pilot valve unit 3. The valve 2, as in this case also the pilot valve 3, is mounted on a manifold device 4 onto a valve interface A—A, wherein the manifold includes a channel 6 for electric cables to the pilot valve, supply channels 7 and 7' and a return channel 8. On the bottom side of the manifold 4, as seen on the figure, it provides a manifold interface B—B where channels 10, 10' for connection with the supply channels 7 and 7' open, comprising a first portion 10, 10' of a connecting channel. Further, a connection channel portion 11, 11' opens in the manifold interface B—B, which portion is drawn from the supply ports of the valve. The corresponding applies for connection channels for delivering pressurised air to a consumer, 16, 16'. These conduits are repeated on both sides of the manifold device due to the symmetry of the valve. On the bottom side of the manifold device 4, a modular body 5 is mounted on the manifold interface B—B, said body according to the invention being possible to modify with respect to its construction and thus provide different functions for the actual valve assembly. In the shown example, the modular body 5 provides a connecting portion 12 comprising a channel portion, which connects said first and second portions, resulting in that the left part of the valve 2 is fed with pressure fluid, here pressurized air, from the supply channel 7. Pressurized air is thus supplied, controlled by the valve, through the connection channel 16 to the consumer over the consumer port 13. Also these functions are doubled in this example and are indicated with '-signs on the right side of the figure. Reference 23 concerns a conduit for leading return fluid to the channel 8.

Figure 2:
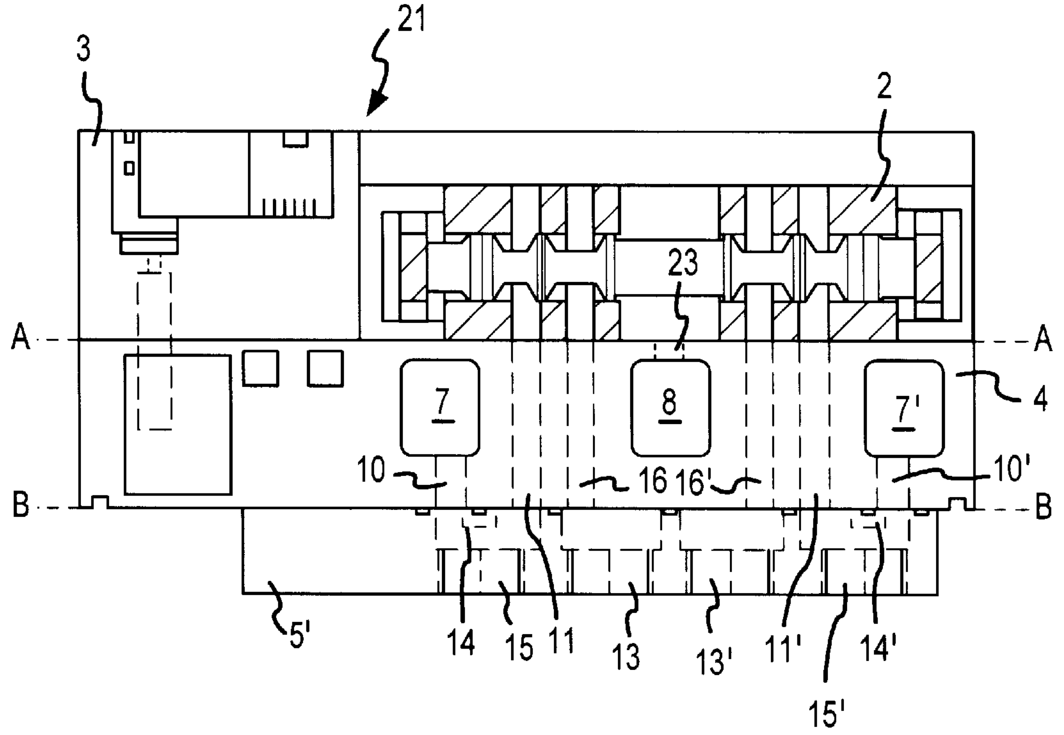
FIG. 2 shows a device according to the invention in a second configuration.

In FIG. 2 reference 21 concerns a valve manifold device having a valve 2 according to a second configuration, wherein in this case the modular body 5' comprises a blocking 14 of the first portion 10 and a thread at 15, comprising a port for separate supply to the valve. The corresponding is arranged on the right side of the figure, and concerning other aspects the configuration is identical with that in FIG. 1.

Figure 3:
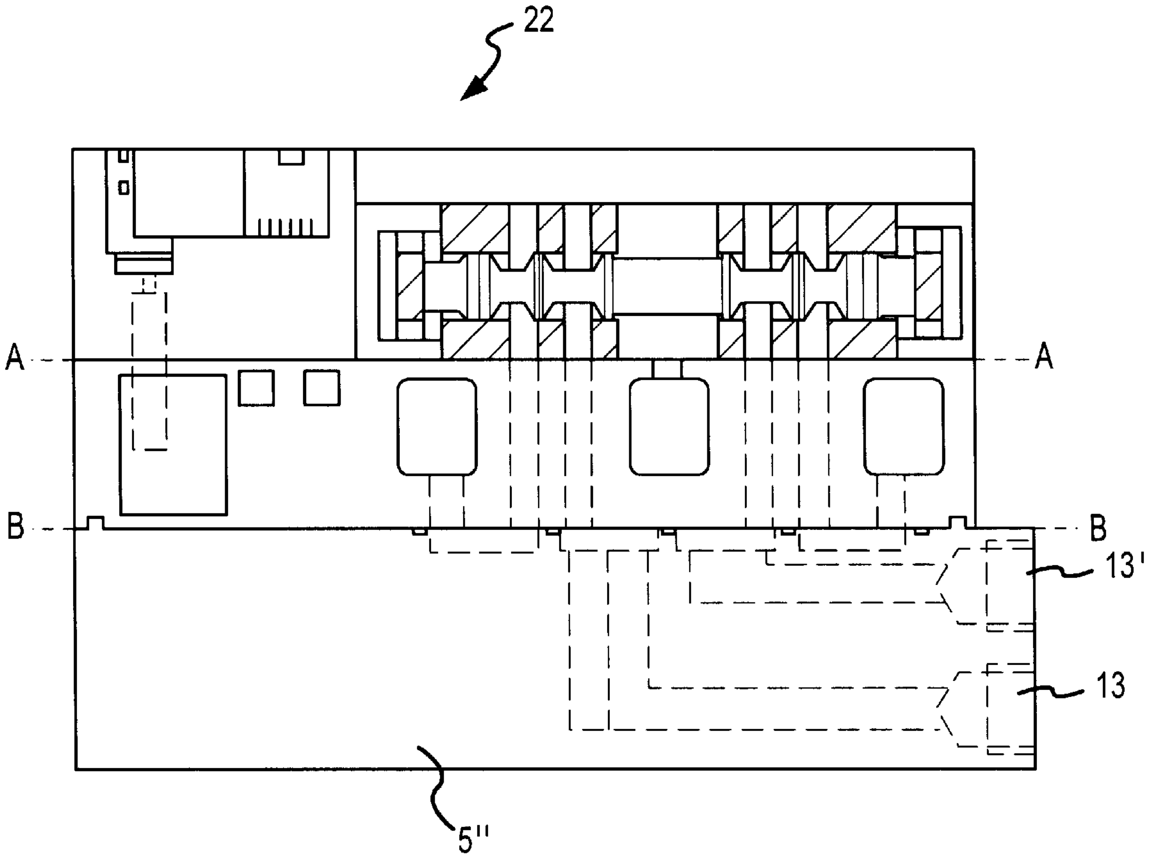
FIG. 3 shows a somewhat modified device according to the invention.

In FIG. 3 reference 22 concerns a modified valve manifold device having a valve, wherein in this case the modular body 5" provides connection channels with consumer couplings 13–13' directed sideways for better availability in certain applications.

Figure 4:
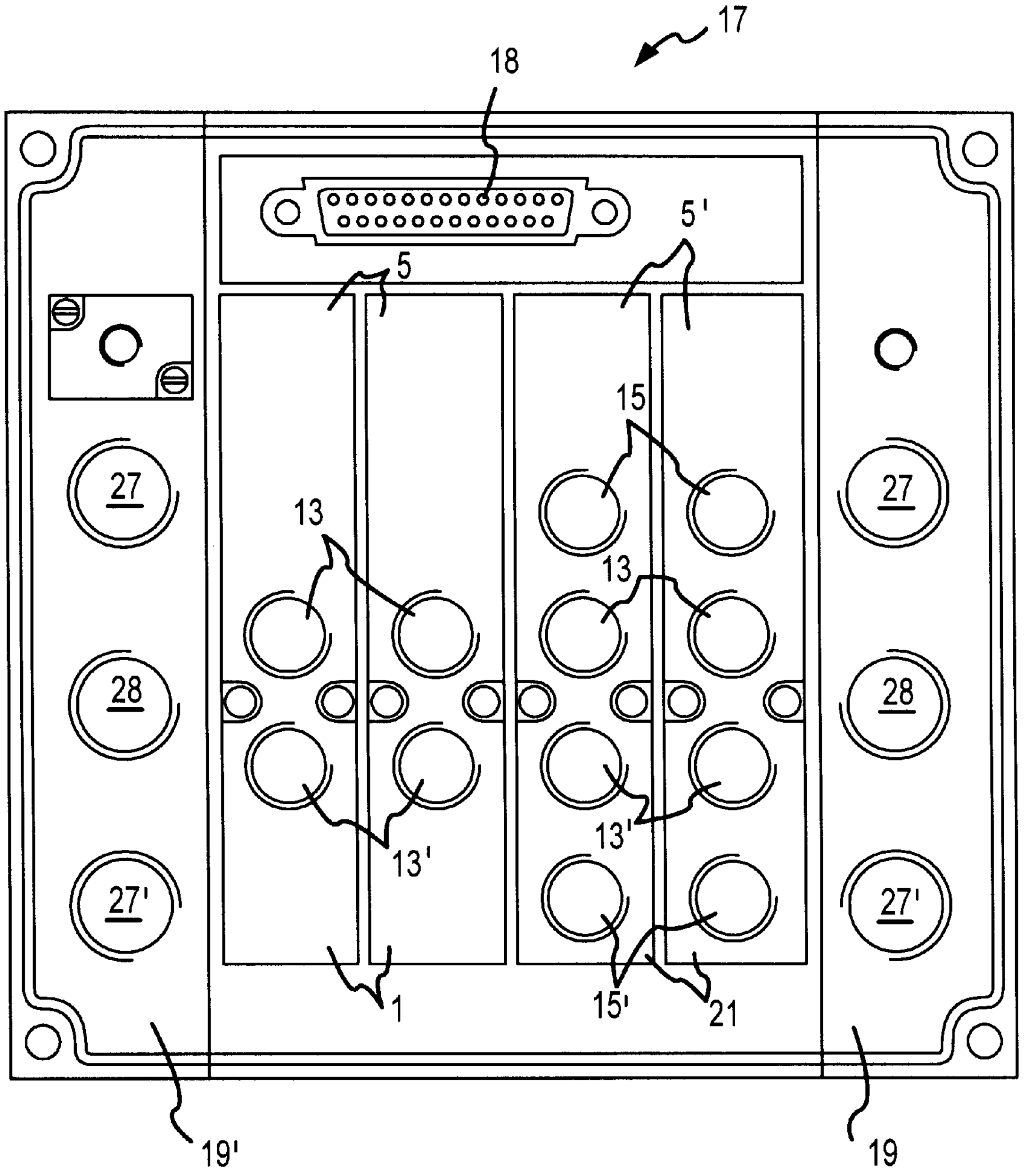
FIG. 4 shows a manifold assembly in a view from below in FIGS. 1 and 2.

In FIG. 4 a manifold assembly 17 is shown from below in FIGS. 1 and 2, whereby the configurations 1 and 21 are illustrated from that direction. Further is shown a signal contact 18 for communication with pilot valves, which are included in the assembly. 19 and 19' concerns end pieces for the manifold device having recesses for supply to the channels 7, 7' and return from channel 8 (in FIGS. 1 and 2). In this case the manifold assembly is fed from both sides over ports 27, 27' and 28' respectively. Other solutions may of course be used such as supply to the entire manifold device over a recess in a modular body.

Figure 5:
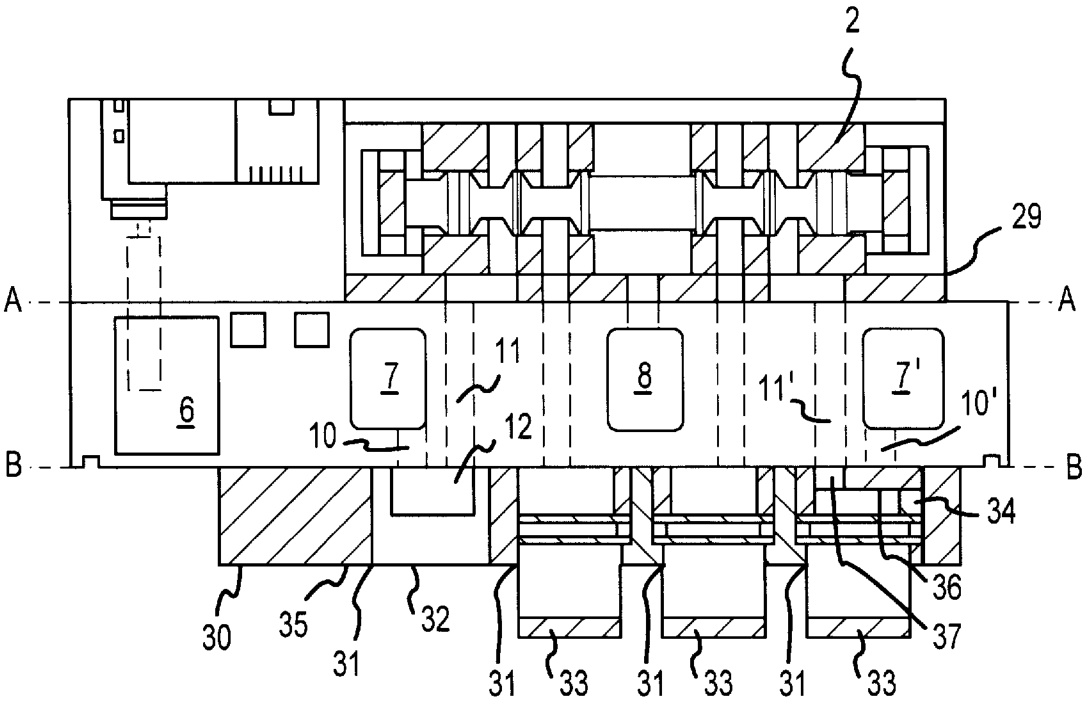
FIG. 5 shows a further modified device according to the invention.

In FIG. 5 there is shown a further modification of the invention having the valve attached to the valve interface A—A over an adapter plate 29, which is adapted to modify and adapt, if necessary, the hole layout between the valve and the manifold in case these hole layouts do not correspond. A modular body 30 is arranged here, having a number, here four, of recesses 31 for guide bodies, in this case in the form of adaption nipples, so that the different functions may be obtained. The recesses are in this case through holes having ring-shaped abutments in the area of the outside/bottom side of the modular body at 35 for holding the nipples. 32 indicates a connecting body for connecting the above mentioned first 10 and second 11 portions of the connecting channel between the valve and the supply channel with the portion 12. In the central recesses 31, there are conduit bodies 33, which in this case are comprised of quick coupling nipples for insertion of tubing. 34 indicates a conduit/blocking body comprising a blocking portion 36, which seals against the supply channel 10' and comprises a through hole 37 for allowing external separate supply of the right part of the valve 2 over the conduit 11'. This arrangement with insertion nipples allows for tubes having corresponding diameters to be easily connected to the manifold device. The dimensions of nipples (and tubes) may be chosen after user need, further accentuating the user-friendliness.

The invention may be modified further within the scope of the annexed claims and as an example the manifold device may be designed otherwise and for example such that the valve interface and the manifold interface form another angle, for example 90° between each other. The manifold device may include more or less channels than shown, and, for example, the supply to the pilot valve may be provided by a channel corresponding to the channel 7 in FIGS. 1 and 2, whereby the manifold device and possibly the modular body include integral conduits for that purpose. Other elements than the ones shown in the figures may also come into question, for example 3/2 or 4/2 valves, vacuum ejector units and so on. The modular bodies are preferably arranged such that each valve is associated with a separate modular body, which promotes the possibility to configure the device, but it is not excluded that the modular body is arranged for configuration of more than one valve.

There is also a possibility of easily modifying the pressure or the flow through arrangements associated with the modular body. As an example it could be mentioned that a pressure regulator may be provided between the channel portions. This way the costly arrangement with a so called sandwich regulator is avoided, which according to the prior art is installed between the manifold device and the valve, and which brings along adjustment problems between the interface surfaces.

Preferably the conduits are drawn linearly through the manifold device, which gives an advantageous flow, but oblique drawing and the like of conduits is also possible if necessary. A connecting portion is preferably constructed such that flow losses are minimised as much as possible. A manifold device included in a valve manifold device according to the invention is easy to manufacture and is preferably manufactured extruded in aluminium or an aluminium alloy or with any suitable manufacturing method in a synthetic material. It is suitable to be built up from stacked manifold plates to a number according to need, but may also be comprised of one block for the manifold assembly. The pilot valve may also be fastened to the valve. The consumer ports may also be placed on the upper side of the valves, that is not in the modular body. The second portion preferably passes at a distance from the channel 7, 7' but may also pass in a sealed manner through the channel 7, 7' without having connection therewith.

The manifold interface is preferably also a user interface, for example when mounting the manifold device in a cabinet, whereby the user may chose the function of the single valve by choice of modular body, which in this way may be seen as a programming body for the valve manifold. In case of more complex drawing of channels than what is shown in the figures, modular bodies may come into question comprising channels in plural levels, for example by arranging a number of plates having different hole layout and channel configuration. A plane sealing gasket of a per se known kind is supplied at the manifold interface as well as at the valve interface.

What is claimed is:

1. A valve manifold device for mounting pressure fluid valves (2) on a surface comprising a valve interface (A—A) and including longitudinal channels (7,7',8) for at least supply fluid, wherein connecting channels are arranged for leading fluid to the valve interface and thereby the different valves, characterised in that the manifold device (4) comprises a manifold interface (B—B) on a side separate from the valve interface (A—A), that each connecting channel for supply fluid includes a first portion (10,10') between a channel (7) and the manifold interface and a second portion (11,11') between the manifold interface (B—B) and the valve interface (A—A), and that a selectable modular body (5,5',5",30) is arranged to connect (12,32) said portions or to block (14,14') the first portion and lead on the second portion, or to block both portions.

2. Valve manifold device according to claim 1, characterised in that the manifold device includes two parallel but independent supply channels (7,7').

3. Valve manifold device according to claim 1, characterized in that the modular body (5,5',5",30) is provided with at least one consumer port (13,13').

4. Valve manifold device according to claim 1, characterized in that each second portion (11,11') is drawn essentially straight through the manifold device and that the associated channel (7,7') is located sideways from this portion.

5. Valve manifold device according to claim 1, characterised in that it comprises at least one fluid conduit for connection with a pilot valve (3).

6. Valve manifold device according to claim 1, characterised in that the manifold device is manufactured extruded in aluminium or an aluminium alloy.

7. Valve manifold device according to claim 1, characterised in that it is manufactured from a synthetic material.

8. Valve manifold device according to claim 1, characterised in that it is built up from a number of stacked manifold plates.

9. Valve manifold device according to claim 1, characterised in that the manifold interface (B—B) is directed essentially 180° separated from the valve interface (A—A).

10. Valve manifold device according to claim 1, characterised in that the manifold interface (B—B) is directed essentially 90° separated from the valve interface.

11. Valve manifold device according to claim 1, characterised in that each valve is associated with a modular body.

12. Valve manifold device according to claim 1, characterised in that more than one valve is associated with a common modular body.

13. Valve manifold device according to claim 1, characterised in that the modular body (30) comprises connections for supply and/or consumer, which are directed essentially 90° separated from the manifold interface.

14. Valve manifold device according to claim 1, characterised in that the manifold device is provided with consumer conduits (16, 16') drawn between the two interfaces, and that the modular body comprises consumer ports (13,13').

15. Valve manifold device according to claim 1, characterised in that the modular body comprises recesses (31) for guide bodies such as connecting bodies (32) or selectable adapter nipples (33) and the like, whereby the latter allow quick coupling of fluid tubes with chosen diameter.

* * * * *